(12) United States Patent  (10) Patent No.: US 9,215,302 B2
Thorson et al.  (45) Date of Patent: Dec. 15, 2015

(54) METHOD AND DEVICE FOR DETERMINING USER HANDEDNESS AND CONTROLLING A USER INTERFACE

(71) Applicant: Motorola Mobility LLC, Libertyville, IL (US)

(72) Inventors: Dean E Thorson, Grayslake, IL (US); Naveen Aerrabotu, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 336 days.

(21) Appl. No.: 13/891,806

(22) Filed: May 10, 2013

(65) Prior Publication Data

US 2014/0335916 A1    Nov. 13, 2014

(51) Int. Cl.
| H04M 1/00 | (2006.01) |
| H04M 1/02 | (2006.01) |
| G06F 1/16 | (2006.01) |
| G06F 3/048 | (2013.01) |
| H04M 1/725 | (2006.01) |

(52) U.S. Cl.
CPC .......... *H04M 1/0281* (2013.01); *G06F 1/1626* (2013.01); *G06F 1/1698* (2013.01); *G06F 3/048* (2013.01); *H04M 1/72519* (2013.01)

(58) Field of Classification Search
None
See application file for complete search history.

(56) References Cited

U.S. PATENT DOCUMENTS

| H716 H | 12/1989 | McDonald et al. |
| 6,491,630 B1 | 12/2002 | Saccardo et al. |
| 6,538,636 B1 | 3/2003 | Harrison |
| 7,068,256 B1 | 6/2006 | Gettemy et al. |
| 7,218,313 B2 | 5/2007 | Marcus et al. |
| 7,653,883 B2 | 1/2010 | Hotelling et al. |
| 7,800,592 B2 | 9/2010 | Kerr et al. |
| 8,098,233 B2 | 1/2012 | Hotelling et al. |
| 8,103,263 B2 | 1/2012 | Shim et al. |
| 8,390,481 B2 | 3/2013 | Pance et al. |
| 8,504,934 B1 | 8/2013 | Yu et al. |
| 2002/0107055 A1 | 8/2002 | Yamazaki et al. |
| 2003/0234768 A1 | 12/2003 | Rekimoto et al. |
| 2005/0154798 A1 | 7/2005 | Nurmi |
| 2005/0159850 A1 | 7/2005 | Melman |
| 2006/0026535 A1 | 2/2006 | Hotelling et al. |

(Continued)

FOREIGN PATENT DOCUMENTS

| EP | 2360560 A1 | 8/2011 |
| EP | 2175344 A3 | 2/2012 |

(Continued)

OTHER PUBLICATIONS

International Search Report and Written Opinion application No. PCT/US2014/037323, dated Aug. 4, 2014, 10 pgs.

(Continued)

*Primary Examiner* — Lana N Le
(74) *Attorney, Agent, or Firm* — Shumaker & Sieffert, P.A.

(57) ABSTRACT

A handheld portable device (10) receives information signals modulated over one or more radio frequency (RF) spectrums includes housing (150), a user interface (62) and a plurality of antennae (A1-A3) that are configured to respond to modulated RF information signals. Receivers (RX1-RX3) receive the modulated RF information signals from the plurality of antennae. A controller (602) determines a user grip from one or more properties of the response to modulated RF signals by respective ones of the plurality of antennae and controls the user interface based on a determined user grip.

19 Claims, 8 Drawing Sheets

(56) References Cited

U.S. PATENT DOCUMENTS

| | | |
|---|---|---|
| 2006/0192724 A1 | 8/2006 | Kezys et al. |
| 2006/0197750 A1 | 9/2006 | Kerr et al. |
| 2006/0197753 A1 | 9/2006 | Hotelling |
| 2007/0010211 A1 | 1/2007 | Mixon |
| 2007/0291831 A1* | 12/2007 | Lee .................. H01Q 1/243 375/227 |
| 2009/0069045 A1 | 3/2009 | Cheng |
| 2009/0143106 A1* | 6/2009 | Meitzler et al. ............ 455/566 |
| 2009/0160792 A1* | 6/2009 | Morohoshi et al. ......... 345/173 |
| 2009/0259969 A1 | 10/2009 | Pallakoff |
| 2010/0013651 A1 | 1/2010 | Spalink |
| 2010/0045705 A1 | 2/2010 | Vertegaal et al. |
| 2010/0097331 A1 | 4/2010 | Wu |
| 2010/0103098 A1 | 4/2010 | Gear et al. |
| 2010/0120466 A1* | 5/2010 | Li ....................... H04B 1/005 455/552.1 |
| 2010/0134423 A1 | 6/2010 | Brisebois et al. |
| 2010/0153313 A1 | 6/2010 | Baldwin et al. |
| 2011/0065392 A1* | 3/2011 | Chung ................ H04B 17/21 455/67.11 |
| 2011/0141120 A1 | 6/2011 | Platzer et al. |
| 2011/0197158 A1 | 8/2011 | Tseng et al. |
| 2011/0234487 A1 | 9/2011 | Hiramoto |
| 2011/0314429 A1 | 12/2011 | Blumenberg |
| 2012/0026110 A1 | 2/2012 | Yamano |
| 2012/0071203 A1* | 3/2012 | Wong ....................... 455/550.1 |
| 2012/0075249 A1 | 3/2012 | Hoch |
| 2012/0113007 A1 | 5/2012 | Koch et al. |
| 2012/0117506 A1 | 5/2012 | Koch et al. |
| 2012/0138441 A1 | 6/2012 | Kim et al. |
| 2012/0188174 A1 | 7/2012 | Migos et al. |
| 2012/0206556 A1 | 8/2012 | Yu et al. |
| 2012/0315954 A1 | 12/2012 | Ahn et al. |
| 2013/0034066 A1* | 2/2013 | Kakishima ......... H04L 27/2613 375/146 |
| 2013/0035139 A1 | 2/2013 | Sheynblat et al. |
| 2013/0038564 A1 | 2/2013 | Ho |
| 2013/0093680 A1 | 4/2013 | Ogita |
| 2013/0237272 A1* | 9/2013 | Prasad ................ H04B 7/0617 455/517 |
| 2014/0032165 A1 | 1/2014 | Sarrafzadeh et al. |
| 2014/0187204 A1* | 7/2014 | Hartmann ............ G60F 21/316 455/411 |
| 2014/0189551 A1* | 7/2014 | Kim ............................ 715/765 |
| 2014/0208128 A1 | 7/2014 | Gyorfi et al. |
| 2015/0002350 A1* | 1/2015 | Vance .................. H01Q 1/243 343/745 |

FOREIGN PATENT DOCUMENTS

| | | |
|---|---|---|
| EP | 2515593 A2 | 10/2012 |
| JP | 2007179502 A | 7/2007 |

OTHER PUBLICATIONS

Andol, "Hand gesture detection and recognition using openCV," retrieved from www.andol.info/hci/895.htm, Jan. 26, 2012, 8 pp.

Stevens, "EyeSight's hand-waving, gesture-based UI now available for Android (video)," AOL Inc., retrieved from http://www.engadget.com/2010/06/08/eyesights-hand-waving-gesture-based-ui-now-available-for-andro/, Jan. 26, 2012, 4 pp.

Sy, Designing IR gesture-sensing systems, online version of Electronics Design, Strategy, News, retrieved from http:// www.edn.com/article/print/518437-Designing_IR_gesture_sensing_systems.php, Jan. 26, 2012, 4 pp.

Wikipedia, "Gesture recognition," retrieved from http://en.wikipedia.org/wiki/Gesture_recognition, Jan. 26, 2012, 7 pp.

Wimmer, et al., "HandSense—Discriminating Different Ways of Grasping and Holding a Tangible User Interface," TEI 2009, Feb. 16-18, 2009, 4 pp.

* cited by examiner

FIG. 1

FIG. 2B Right Hand Grip

FIG. 2A Left Hand Grip

METHOD AND DEVICE FOR DETERMINING USER HANDEDNESS AND CONTROLLING A USER INTERFACE

BACKGROUND

1. Field of the Disclosure

The disclosure relates to improved handheld devices, and more particularly to an improved method and apparatus for detecting and enhancing handed operation.

2. Background

User interfaces of handheld device are generally designed for optimum use by the majority of the population who use right-handed grips. As such, interfaces that are used most often, for example, volume controls, are positioned in the right hand of the device for easy access by right-handed users. For the left-handed users, however, such interface may be awkward requiring use of a second hand.

Handheld devices capable of detecting user handedness and operating based on such determination are known. For example, touch sensors comprising capacitive elements can be used to determine user handedness. Such handedness determination is then used for reconfiguring user interfaces such as position and size of button zones presented to users.

Also known are handheld devices that operate based on a user's grip. A grip sensor on a mobile terminal can be used for generating sensing signals corresponding to a user grip. A control unit in the mobile terminal identifies a grip pattern based on the sensing signals and uses this information for controlling transmit power and antenna tuning.

Conventional approaches for user grip detection require extra components and sensors that add to the complexity and cost of devices incorporating the approach. Thus, there exists a need for a handheld portable device that determines user grip without the drawbacks of the prior art.

DETAILED DESCRIPTION

The following is a detailed description and explanation of various embodiments.

Figure 1:
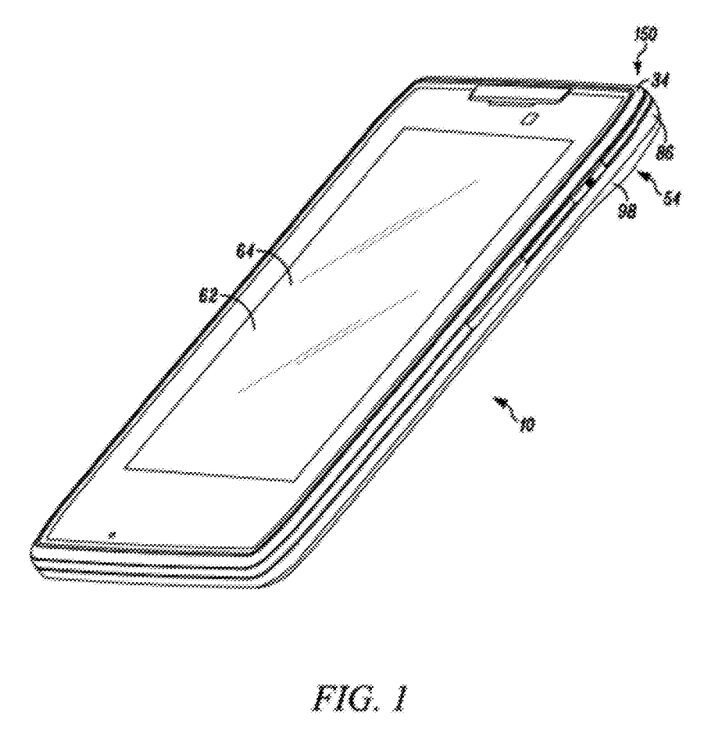
FIG. 1 is an exemplary front perspective view of a handheld portable device.

FIG. 1 shows a perspective view of a handheld device 10. The handheld portable device 10 can be any type of handheld portable device that can be gripped by a user while the device is wirelessly receiving modulated signals over one or more frequency spectra, such as radio frequency (RF), via a plurality of antennae. Such signals could contain any variety of information such as data, voice, text, video, image signals amongst others. Examples of portable devices that could advantageously use handedness detection include but are not limited to flip phones, slider phones, portable networking devices, internet communications devices, clamshell devices, tablet devices, radio telephones, cellular phones, mobile phones, smart phones, portable gaming devices, personal digital assistants, wireless e-mail devices, two-way pagers, mobile computing devices or any other handheld electronic devices.

According to one embodiment, the handheld portable device 10 includes a user interface 62 suitably designed for easy user interface via a touch screen display 64. An example of a housing 150 is configured to allow users to interface with the handheld device 10 using a variety of user grips. The housing 150 is made up of a front housing 34 and a rear housing 86 that preferably define a narrow profile height and are made as is well known of a variety of materials, such as a plastic or metal. The rear housing 86 can include a trim module 98 covering as least some of a plurality of antennas that are located on an outer periphery of the rear housing 86. In one embodiment, the trim module 98 comprises a suitable material such as polycarbonate that allows radio frequency signals to pass freely with minimal signal loss. As further described below in more detail, the plurality of antennae are positioned around the perimeter of the device 10 and are configured to respond to modulated information signals, such as RF signals. Antennae in the device can be optimized for the same or different frequencies of operation, and may, for example, be used by the device to communicate via a multitude of communication frequencies, such as those employed for: cellular communications, such as GSM, CDMA, WCDMA, or LTE; location or other satellite communications, such as GPS; local area networking, such as Bluetooth; WiMax and WiFi; broadcast services; or any combination thereof.

Figure 2A:
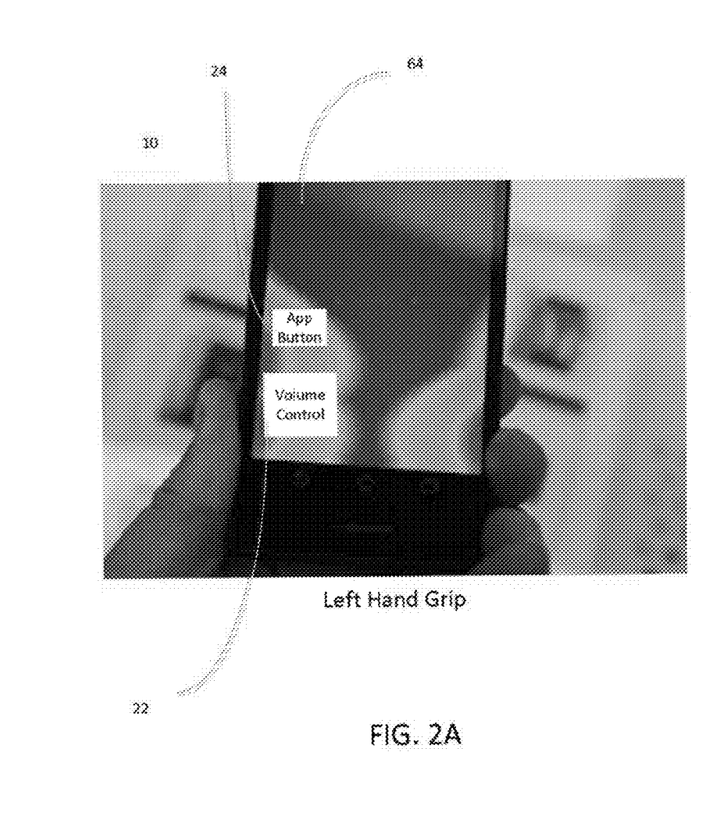
FIGS. 2A and 2B depict the handheld portable device in FIG. 1 being held by a left hand user grip and a right hand user grip, respectively.
Figure 2B:
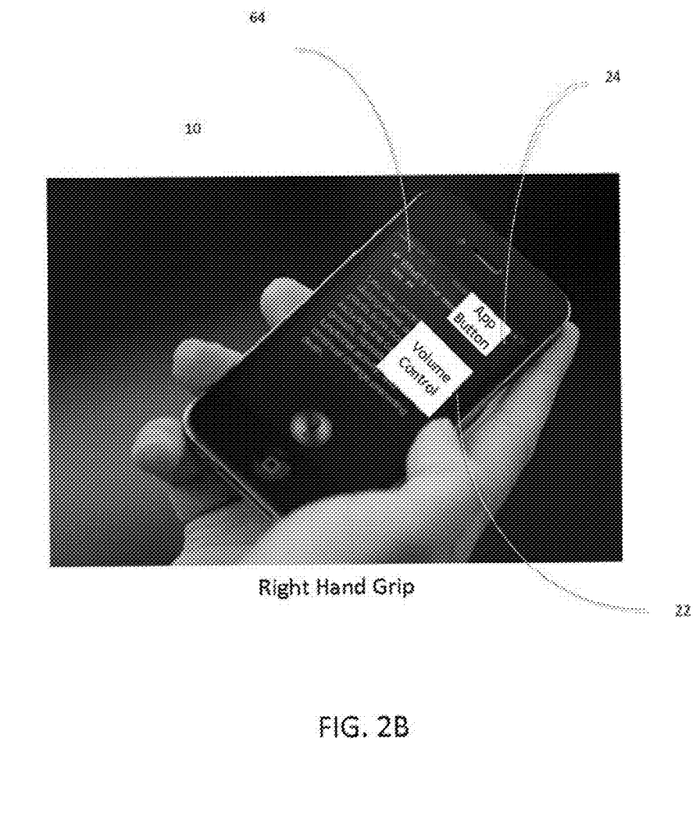

FIGS. 2A and 2B show the handheld portable device 10 with its touch screen 64 displaying a number of user interface icons such as a volume control icon 22 and an application button icon (App Button) 24. Depending on handedness, the users can hold the device 10 by a left hand grip (LHG), as shown in FIG. 2A, or a right hand grip (RHG), as shown in FIG. 2B. As further described below, other grip configurations can be used; for example, the user can grip the device with both hands. When gripped, one or more of the antennae of the handheld device 10 will experience loss in the wireless communication link as a result of a change in impedance as seen at the antenna port or absorption of the signal caused by the hand, depending in part upon the frequency of the signal. Such losses are examples of what is referred to as "de-tuning" herein, and affect how the antennae respond to modulated RF signals.

Handheld devices capable of detecting user handedness and operating based on such determination have in the past used touch sensors comprising capacitive elements to determine user handedness. The touch sensors, however, are typically positioned around the periphery of a handheld device, which will put them in close proximity to antennae located around the periphery. Such close proximity of capacitive elements of the touch sensors to the antennae will interfere with antennae operations during transmission and reception of RF signals.

As further described below, handedness of a user grip can advantageously be determined from one or more properties of the response to modulated RF information signals by respective ones of the plurality of antennae. Handedness information can then be used to re-configure the user interface with the handheld device 10. For example, if a user holds the device 10 with a right hand grip, as shown in FIG. 2B, the device 10 is configured such that the volume control icon 22 and App Button 24 are placed within easy access of the user's right hand thumb. If, however, another user holds the device with a left hand grip, the volume control user interface and App Button 24 are placed within easy access of the user's left hand thumb, as shown in FIG. 2A. Thus, for one embodiment customization of user interfaces based on handedness using the antennae of the handheld device 10 is enhanced.

Figure 3:
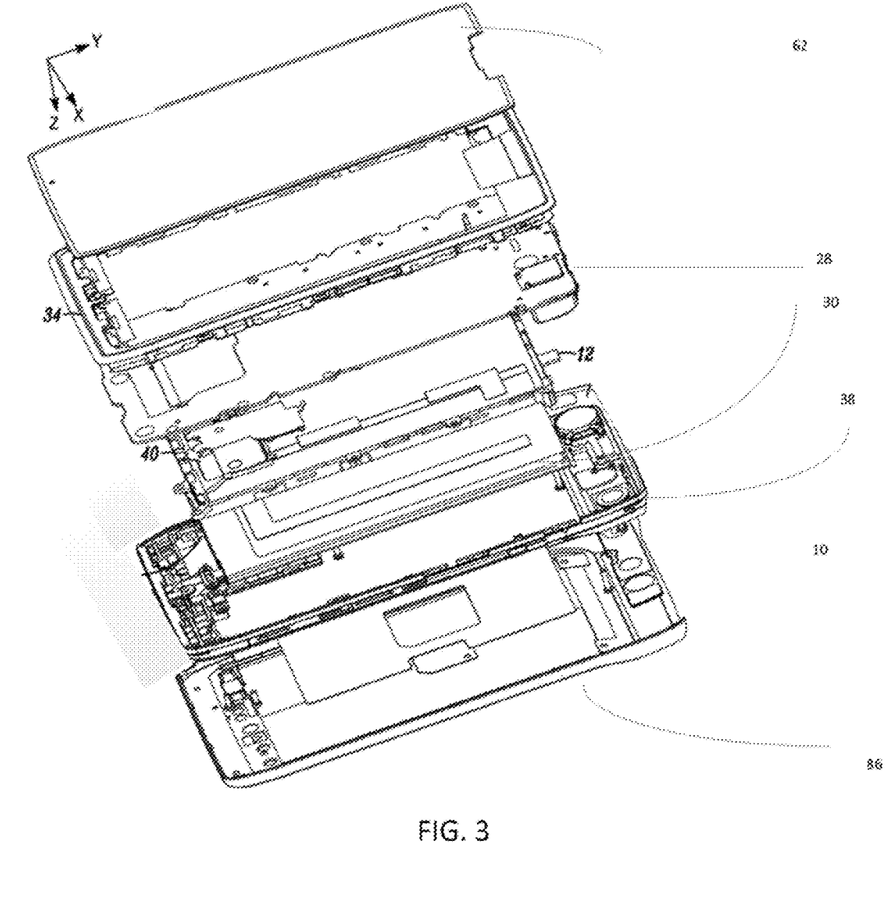
FIG. 3 is a perspective exploded view of the handheld portable device in FIG. 1.

FIG. 3 shows an exploded perspective view of various components making up the handheld portable device 10 of FIG. 1. The exact construction of the device is not important, and the description herein is only provided by way of example. Those skilled in the art will recognize that there are a variety of different ways to assemble a device including antennae into a housing, and the construction is not technically essential. The example device 10 has a generally rectangular shape extending in X-Y dimensions and a thin profile extending in the Z dimension. Preferably, the front housing 34 includes an outer and lower periphery complementarily configured to be nested with and received by an upper and inner periphery of the rear housing 86, for minimizing the profile of the device 10 in the Z dimension. Under this arrangement, a frame 12 is adapted to help align various components of the device 10 in a stacked relationship. More specifically, the frame 12 aligns a printed circuit board 28 with the front housing 34 via connectors that are connected to an outwardly extending flange 30 in proximity to the upper portion of the frame 12. Preferably, the frame 12 comprises a metallic material that can provide a durable chassis-like structure and shielding that can be grounded to the printed circuit board 28.

The printed circuit board 28 carries various circuitry, including integrated circuits, discrete components and the like, which are positioned on the printed circuit board 28 in a well-known manner. Powered by a battery (not shown), the printed circuit board 28 implements various functional blocks for operating the handheld device 10, including RF receiver and transmitter functionalities for modulating and demodulating information signals communicated via the antennae, such as voice, text, video, image, etc. Also included on the printed circuit board 28 are various processors (e.g., baseband processor, image processor, etc.) and controllers that implement various processing and control functions. The printed circuit board 28 further includes storage devices that store programs, applications and various user profiles, including user grip profiles as further described below.

Figure 4:
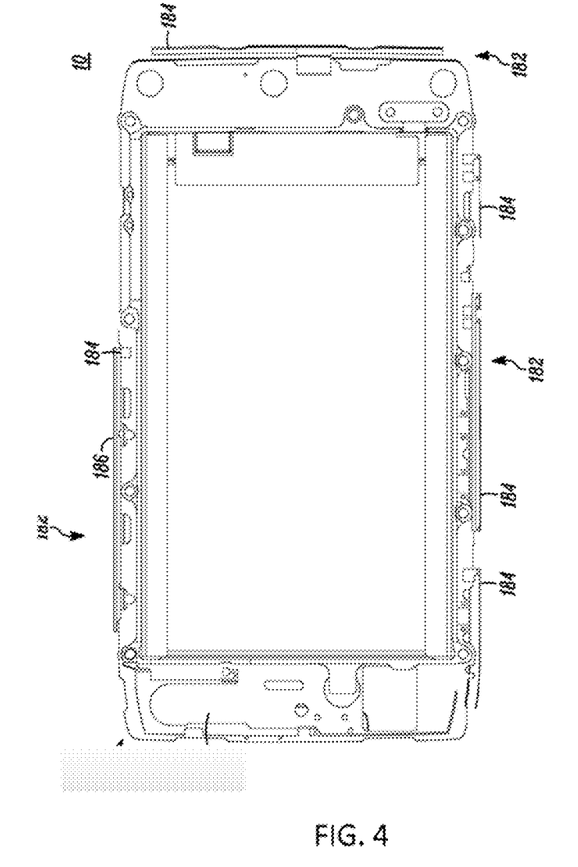
FIG. 4 is an enlarged plan layout view of the handheld portable device in FIG. 1, showing the position of a plurality of antennae.

FIG. 4 shows enlarged plan layout views of handheld device 10 depicting the placement of a plurality of antennas. Each antenna 182 has a metal pattern 184 covered by a protective coating 186, for providing desirable antenna characteristics. In one embodiment, each antenna includes a narrow metal pattern 184 aligned in at least one of an X axis and Y axis, so as to take up minimal space requirements and minimal Z dimensions. Those skilled in the art will recognize that the described antennae are only provided by way of example, and any suitable antennae structure may be used.

Figure 5:
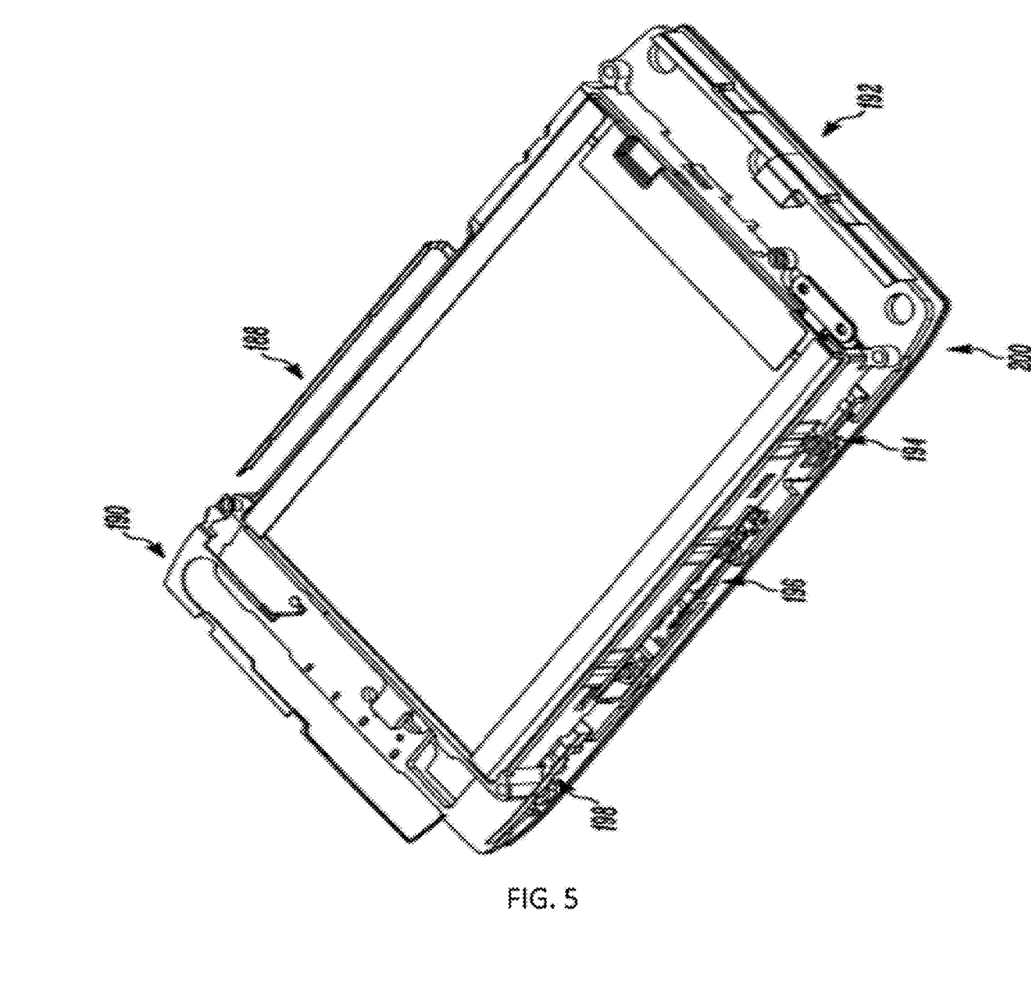
FIG. 5 is an enlarged-perspective layout view of a specific layout of the plurality of antennae shown in FIG. 4.

FIG. 5 shows enlarged-perspective layout view of a specific example of a layout of a diversity antenna 188, LTE transceiver antenna 190, main antenna 192, a BT/WiFi antenna 194, diversity antenna 196 and GPS/location antenna 198. FIG. 5 shows the plurality of antennae being sufficiently spaced from an adjacent antenna, so as to minimally interfere with an adjacent antenna. The antennae may be located on an outer periphery on an edge 200, or within the housing more spaced from the periphery. The antennas 182 can be located on each side and around the device 10, to provide a sufficient distance from adjacent antennas to minimize undesirable EMI leakage to adjacent antennas.

Figure 6:
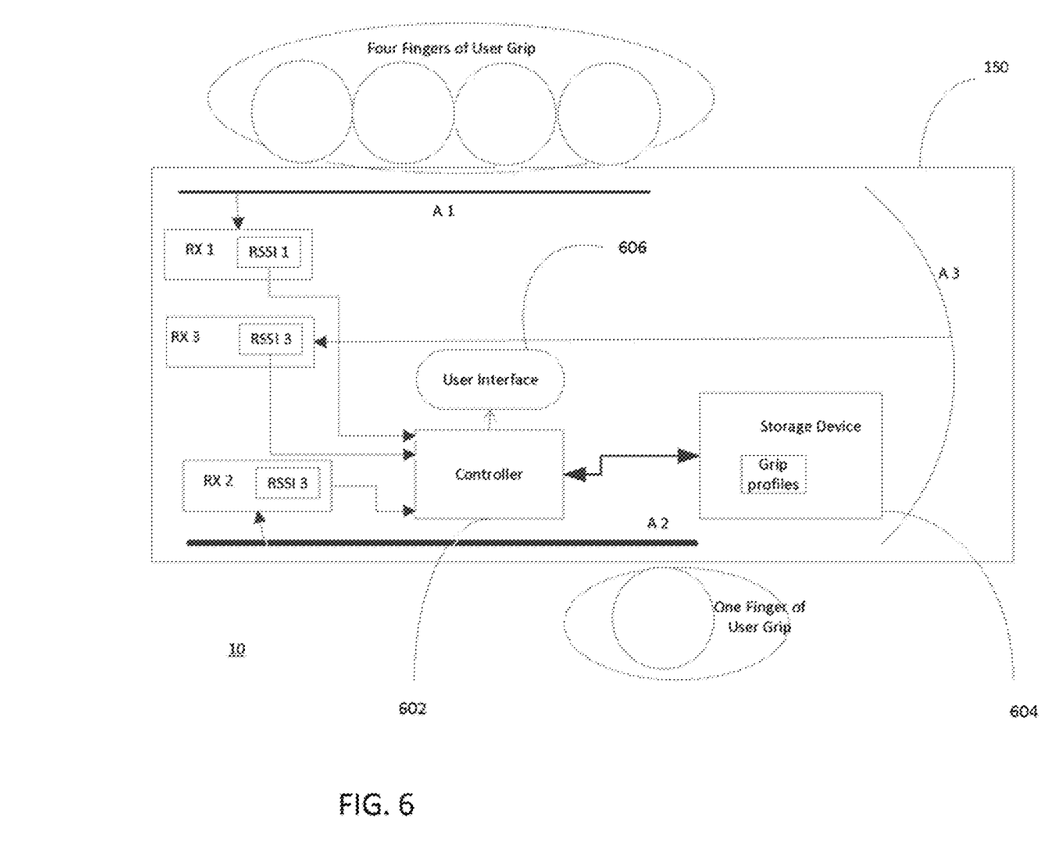
FIG. 6 is a functional block diagram of the handheld portable device in FIG. 1.

Referring to FIG. 6, a functional block diagram of the device 10 with the housing 150 is shown to be configured to allow users to interface with the handheld device 10 via a variety of grips, e.g., right or left hand grips. The housing 150 carries a plurality of antennae A1, A2 and A3 that respond to modulated RF information signals comprising RF signals that are modulated with information signals. The plurality of antennae A1-A3 are coupled to corresponding receivers RX1, RX2, and RX3. RX1-RX3 demodulate the received modulated RF information signals to recover information signals. Information signals that are demodulated could be any variety of signals such as data, voice, text, video, image signals amongst others.

The device 10 also includes circuitry for measuring certain properties of the modulated RF information signals at the plurality of antennas. The measured properties of modulated RF information signals could be received signal quality measures such as received signal strength indicator (RSSI), Bit Error Rate (BER), Reference Signal Received Power (RSRP), Reference Signal Received Quality (RSRQ), or Signal to Noise Ratio (SNR). FIG. 6 shows RX1, RX2, and RX3 including corresponding RSSI circuitry RSS1, RSS2, and RSSI3.

In one embodiment, the handheld device 10 is configured for diversity reception, as required for example under CDMA and LTE protocols, via two antennae: a main antenna and a diversity antenna. In one example of FIG. 6, the antennae A1 can be the main antenna and A2 can be the diversity antenna. Under another example of FIG. 6, the antenna A1, A2 and A3 could be part of a multiple-in multiple-out (MIMO) antenna arrangement. In still another example, one or more antennae A1-A3 could be used for independent communication purposes (e.g., WiFi, Bluetooth, diversity, MIMO, or another wireless communication link). Under any such antenna configuration, responses to RF modulated information signals at the antennae are used for determining user grips as described in greater detail herein below.

A controller 602 executes instructions to determine a user grip from one or more properties of the response to modulated RF signals by the plurality of antennae. After such determination, the controller controls a user interface 606 based the determined user grip. The determination of the user grip according to one embodiment is based on relationships between one or more properties of the modulated RF information signals at respective ones of the plurality of antennae. For example, such relationships could be expressed in terms of relative measurements of received signals, such RSSI, BER, RSRP, RSRQ, or SNR, or by a combination of more than one of these me measurements, via respective ones of these plurality of antennae A1-A3.

A variety of relationships or matrices are used to determine handedness. The geometry of the antennas distributed in specific known locations around the housing 150 of the device, and a matrix of expected antenna losses due to handedness, can be used to determine right handed, left handed, or two handed grip, and responsive thereto to control a user interface, e.g., the position of icons on the display, such as the volume control. In the example illustrated in FIG. 6, four fingers in the user's grip are positioned on the housing 150 in close proximity to the antenna A1 and one finger is positioned in close proximity to the antenna A2. As a result, the antenna A1 is shadowed more than the antenna A2. Thus, the user grip shown in FIG. 6 de-tunes the antenna such that $RSSI_{A2} > RSSI_{A1}$. As used herein, $RSSI_{A1}$ is the RSSI measurement for antenna A1, $RSSI_{A2}$ is the RSSI measurement for antenna A2, and the like. Conversely, an opposite user grip shadows the antenna A2 more than the antenna A1 resulting in an antenna de-tuning that $RSSI_{A1} > RSSI_{A2}$. Thus, one example of a relationship used to determine a user grip requires comparison of measurements, e.g., RSSI, which may be impacted due to antenna de-tuning by a user grip. Those skilled in the art will recognize that methods of measuring RSSI are well known. In this way, depending on which side A1 is positioned relative to A2, e.g., right side vs. left side, the type of the user grip, e.g., right grip vs. left grip, can be determined by comparing the RSSIs measured for the antennae A1 and A2. Those skilled in the art will recognize that other measurements dependent on the antenna near field can be used for determining the user grip, and that other relationships can be used as criteria for determining handedness. The relationship can be expressed in terms of a comparison, a ratio, a proportion, or the like. Additionally, a device specific table can be created that has respective measurements for each of the antennas recorded for a large sampling of users, each user holding the specific device in a right handed, left handed, and two handed grip. From the sampling, respective ratios of measurements for the antennas can be determined for each of the positions. The table can be saved, and the measurements taken at any time can be applied to the table to predict which hand is holding the device at any sampling time. The relationships may be based on RSSI, BER, RSRP, RSRQ, SNR, or any other measurement indicative of loss at each antenna, or a combination of such measurements from a selected subset of the antennae, or from all antennas.

Additionally, it is envisioned that the antenna signal measurement relationships used to determine handedness can be modified during actual use based on user feedback. In particular, the relationship of the respective signal measurements for the respective antennae can be used by the handset circuit to select a particular handedness for the user interface (right, two-handed, or left handed). In the event that the handedness is wrong, the user can select a different handedness using a menu on the device. The device control circuitry can then associate the corrected handedness with the relationship of the current measurements. In this way, the measurements can be adjusted for the particular user on the device. It is envisioned that the proportional relationship of the respective measurements, or value ranges stored in the table, that are associated with the respective antennas would be adjusted using the real feedback for the actual user of the particular device so that measurements would produce the correct handedness for the particular user.

Figure 7:
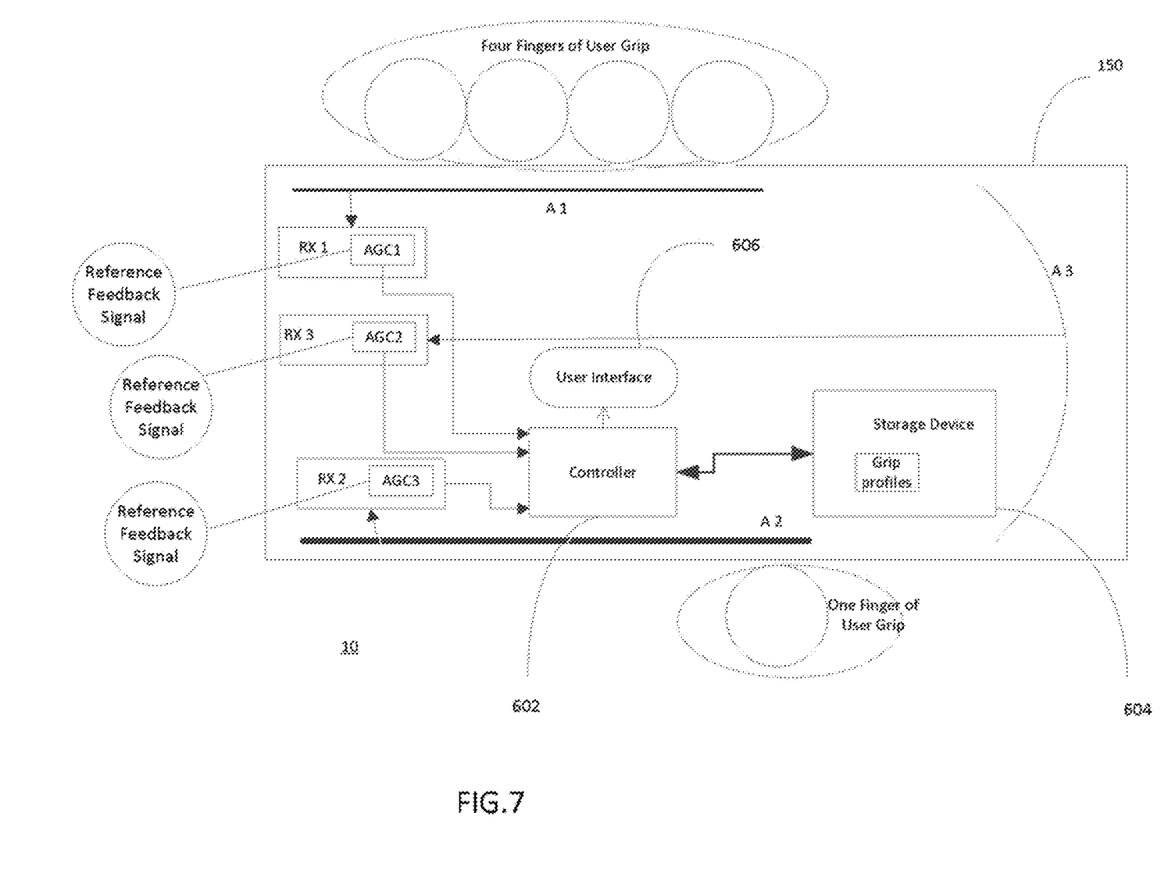
FIG. 7 is a functional block diagram of another embodiment of the handheld portable device in FIG. 1.

According to another embodiment, the device 10 can comprise a plurality of closed loop antennae systems. Each closed loop antenna system relies on reference feedback signals for adjusting the gains of corresponding amplifiers. Such reference feedback signals are user grip dependent since the gain for a particular amplifier associated with a particular antenna will be adjusted to compensate for the actual loss imposed on the signal emitted by the antenna due to hand grip. FIG. 7 shows the receivers RX1-RX3 being equipped with automatic gain control (AGC) amplifiers, for example, low-noise amplifiers (LNAs) that amplify received RF modulated information signals at the antennae according to a reference criteria, for example, to maintain their receiver output at a constant level or above a desired level. Thus, the plurality of antennae are associated with respective automatic gain control (AGC) amplifiers that are responsive to corresponding reference feedback signals that set variable thresholds for adjusting amplifier gains. Since the loss experienced by the signals processed by each of the plurality of antennae and receiver in response to a particular modulated RF information signal is based on the user grip, the reference feedback signals correspond to the properties of received RF modulated information signals that are impacted by user grips. In this way, the relationship of the parameters associated with reference feedback signals, e.g., gain, coefficients, etc., can be correlated for determining various types of user grips based on their impact on properties of RF modulated information signals at the plurality of antennae.

In another embodiment, the properties of RF modulated information signals that are impacted by user grips correspond to properties of transmitted RF modulated information signals from the device 10 that are received at one or more remote devices such as remote base stations. Based on such properties of the transmitted RF modulated information signals, a remote device calculates reference feedback signals based on certain defined criteria. The calculated reference feedback signals are transmitted to the device 10 for adjusting closed loop antenna amplifier gains. The device 10 uses the reference feedback signals received from the remote devices to change the gains of amplifiers associated with one or more of the plurality of the closed loop antennae. Under this embodiment, such received reference feedback signals would be changed by the presence of a hand in a manner that can be correlated with different grip types and can be used for determining user grip.

One embodiment associates each user grip with a corresponding user grip profile, e.g., LHG profile and RHG profile. Each profile relates one or more measured properties of received modulated RF information signals at the plurality of antennae with a corresponding user grip. Under this arrangement, the grip profile specifies the relationship between a grip type and one or more of the RSSI, BER, RSRP, RSRQ, and/or SNR measures or AGC reference feedback signals at plurality of antennae.

For example, the left hand grip profile (LHG profile) would specify the RSSI measure on the main antenna as greater than the RSSI measure on the diversity antenna. Conversely, in the right hand grip, the opposite effect would happen. Thus, the right hand grip profile (RHG profile) would specify the RSSI measure on the main antenna as less than the RSSI measure on the diversity antenna. The RHG and LHG grip relationships below specify relationships that are based on received signal strength indicator RSSIs of the modulated RF information signals at the first and second antennas.

LHG Relationship $RSSI_{A1} > RSSI_{A2}$

RHG Relationship $RSSI_{A2} > RSSI_{A1}$

A storage device 604 (shown in FIGS. 6 and 7) stores grip profiles of the one or more properties associated with different respective user grips. The controller 602 accesses the storage device 604 to retrieve grip profile information and operate the device 10 based on a determined grip.

Additionally, it is envisioned that proportionality coefficients can be used. For example LHG Relationship if $C1*RSSI_{A1} > C2*RSSI_{A2}$ RHG Relationship if $C3*RSSI_{A2} > C4*RSSI_{A1}$ It is envisioned that antenna A1 can correspond to one of the side antennas on the side of the handset of FIG. 4, and antenna A2 can correspond to one of the side antennas on the opposite side of the handset in FIG. 4. The coefficients (C1-C4) may be initially calculated for a particular device based on sampling a large number of users gripping a particular device. The stored coefficients on a particular handset could then be modified during actual use based on user indicating an error in the user interface handedness responsive to a particular grip. Additionally, any suitable measurement could be used in place of RSSI. Finally, for values where handedness cannot be particularly determined from the respective measurements taken, a default handedness may be used.

Under yet another embodiment, calibration information created during the design process of a particular device model can be used for creating grip profiles. Calibration of the device is based on the physical geometry of the antennae and their positions within the housing. Under this arrangement, the device 10 is tested to measure performance in free space, in a dummy right hand and a dummy left hand for various properties. The signal quality metrics for various antenna arrangements (e.g. diversity, MIMO, etc.) are calculated and compared to calibration factors that correlate to hand grip. Then, the device can be re-configured to put the user interface and controls within thumb access of the hand actually holding the device. Each profile can for example comprise a lookup table specifying antenna loss or de-tuning characteristics, e.g., in terms of shadowing, signal loss, etc., for each user grip orientation. Under this arrangement, the controller conducts a best match search of the lookup table to determine handedness. The controller modifies the determined user grip over time based upon error metrics calculated by the user and over-riding the handedness choice manually. If over-ridden, then the metric associated with that decision is re-categorized to point to the correct handedness.

Figure 8:
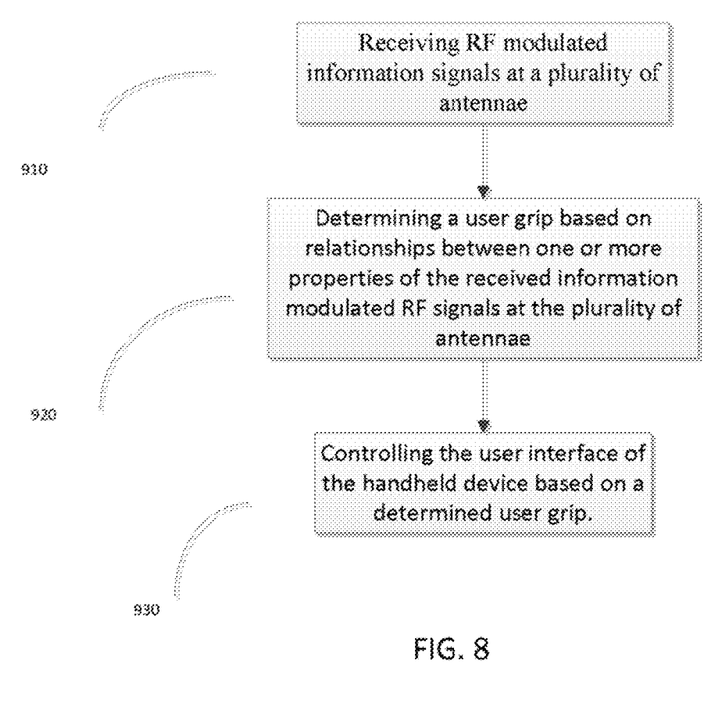
FIG. 8 is a flow chart of user grip determination method for controlling a user interface of a handheld portable device.

FIG. 8 shows the flow chart of user grip determination method according to one embodiment for controlling a user interface of the handheld portable device 10. Under the method, RF modulated information signals at a plurality of antennae are received, block 910. A user grip is then determined based on relationships between one or more properties of the received information modulated RF signals at the plurality of antennae, block 920. The user interface of the handheld device is controlled based on a determined user grip, block 930, for example, a user interface configuration displayed on the handheld device is selected based on the determined user grip.

From the foregoing, it would be appreciated that the antennae contained in the device 10 can be used for communication of RF modulated information signals and for determining user handedness, thereby circumventing the need for using additional components that add to the size, complexity, or cost of the device. Thus, an improved way for operating handheld portable devices based on various types of user grips is provided by taking advantage of antennae's de-tuning properties caused by human body.

Although embodiments have been shown and described, it is to be understood that various modifications, substitutions, and rearrangements of parts, components, and/or process steps, as well as other uses of the mobile electronic device can be made by those skilled in the art without departing from the novel spirit and scope of the invention which is defined by the claims.

What is claimed is:

1. A handheld portable device comprising:
   a housing;
   a user interface;
   a plurality of antennae carried by the housing, the plurality of antennae configured to respond to modulated radio frequency information signals;
   one or more receivers carried in the housing and coupled to the plurality of antennae to receive the modulated radio frequency information signals from the plurality of antennae; and
   a controller carried in the housing, wherein the controller is operable to determine, based on a matrix of expected antenna loss due to handedness, a user grip from a respective signal quality measure at each antenna of the plurality of antennae and to control the user interface based on the determined user grip, wherein the user grip includes one or more of a right handed grip, a left handed grip, or a two handed grip.

2. The handheld device of claim 1, wherein the signal quality measure comprises at least one of a received signal strength indicator, bit error rate, Reference Signal Received Power, Reference Signal Received Quality, or signal to noise ratio.

3. The handheld device of claim 1, wherein the controller determines the user grip based on a relationship defined in terms of corresponding magnitudes of the respective signal quality measure at each antenna of the plurality of antennae.

4. The handheld device of claim 3, wherein the relationship relates to whether the magnitude of a first signal quality measure at a first antenna of the plurality of antennae is greater or less than the magnitude of a second signal quality measure at a second antenna of the plurality of antennae.

5. The handheld device of claim 1,
   wherein at least some of the plurality of antennae are associated with a respective automatic gain control amplifier responsive to reference feedback signals, and
   wherein the controller is further operable to determine the user grip based on reference feedback signals associated with respective automatic gain control amplifiers associated with each antenna from the plurality of antennae.

6. The handheld device of claim 1, further including a storage device that stores grip profiles of the one or more properties associated with different respective user grips.

7. The handheld device of claim 6, wherein different grip profile information is derived from calibration of the plurality of antennae using different grips.

8. The handheld device of claim 6, wherein grip profiles include at least one grip profile associated with a left hand grip and at least one grip profile associated with a right hand grip.

9. The handheld device of claim 1, wherein the user interface comprises a touch screen display, and the controller controlling the presentation of at least one icon on the touch screen display, and wherein the interface controller controls the position of the interface icon on the display based on the determined user grip configuration.

10. The handheld device of claim 1, wherein the user interface is controlled by changing a functionality associated with the user interface.

11. The handheld device of claim 10, wherein the user interface comprises at least one of a switch, button, or a mechanical control.

12. A system comprising:
    one or more receivers configured to receive respective modulated radio frequency information signals using respective antennas; and
    a controller configured to determine, based on a matrix of expected antenna loss due to handedness, a user grip from a respective signal quality measure at each of the respective antennas, wherein the user grip includes one or more of a right handed grip, a left handed grip, or a two handed grip and control a user interface displayed on a handheld device based on the determined user grip.

13. The system of claim 12, wherein the user interface is controlled by changing a functionality associated with the user interface.

14. The system of claim 12, wherein the user interface comprises an interface icon on a display of the handheld device, and wherein the controller positions the interface icon on the display based on the determined user grip configuration.

15. The system of claim 12, wherein the controller changes the position of the user interface icon in response to determining change in the user grip.

16. A method for determining a user grip holding a handheld device and controlling a user interface of the handheld device, the method comprising:
    receiving radio frequency modulated information signals at a plurality of antennae;
    determining, based on a matrix of expected antenna loss due to handedness, a user grip from a respective signal quality measure at each antenna of the plurality of antennae, wherein the user grip includes one or more of a right handed grip, a left handed grip, or a two handed grip; and
    controlling, based on the determined user grip, the user interface of the handheld device.

17. The method of claim 16, wherein controlling the user interface comprises changing a functionality associated with the user interface.

18. The method of claim 16, wherein the user interface includes a display icon presented on a display of the handheld device, and wherein controlling the user interface includes positioning the icon on the display based on the determined user grip.

19. The method of claim 16, wherein the position of the icon is changed upon determination of a change in user grip.

* * * * *